MAGNETIC SIGNAL DISTRIBUTION SYSTEM

Filed April 25, 1958 3 Sheets-Sheet 1

INVENTORS
TUNG C. CHEN
OSCAR B. STRAM
BY Francis A. Varallo
AGENT

MAGNETIC SIGNAL DISTRIBUTION SYSTEM

Filed April 25, 1958 3 Sheets-Sheet 2

INVENTORS
TUNG C. CHEN
OSCAR B. STRAM
BY Francis A. Varallo
AGENT

INVENTORS
TUNG C. CHEN
OSCAR B. STRAM
BY
Francis A. Varallo
AGENT

1

3,112,474

MAGNETIC SIGNAL DISTRIBUTION SYSTEM

Tung Chang Chen, Havertown, and Oscar B. Stram, Paoli, Pa., assignors to Burroughs Corporation, Detroit, Mich., a corporation of Michigan Filed Apr. 25, 1958, Ser. No. 730,885
14 Claims. (Cl. 340—174.1)

This invention relates generally to magnetic switching devices and more particularly to a system for distributing digital information stored on a magnetic disc or drum to a plurality of output circuits without the use of movable wiping contacts or need for separate amplifiers to drive each of said output circuits.

Switching devices which use relatively movable contacts such as brushes and commutators or collector rings have been used to distribute the signals stored on a rotating disc or drum to a number of stationary utilization circuits. These switching devices tend to produce electrical noise and wave distortion; and have the further disadvantage of requiring frequent replacement due to exessive wear of the moving parts. Systems incorporating such switching devices often require individual power amplifiers to drive each of the several output circuits.

Another type of switching device has been disclosed by the Marcel Guerin et al. U.S. Patent 2,098,002, wherein a stationary assembly comprising primary and secondary coils or windings is fitted with a rotating armature operative to vary the inductive effect of the primary on the secondary. This device eliminates brushes and commutators and their attendant disadvantages. All of the embodiments of the Guerin et al. switching device are directed to applications involving display lighting circuits wherein groups of lamps are intermittently lighted and extinguished.

The switching device of the instant invention is related to the Guerin et al. invention in that the effect of a primary coil carrying a signal voltage on a plurality of secondary coils is dependent upon the position of a third element interposed between said primary and secondary coils and adapted to vary the magnetic coupling therebetween. However the device disclosed by Guerin et al. is extremely limited in the number of secondary output circuits over which a signal voltage can be sent before there is substantial crosstalk among the output circuits. It should be appreciated that while the distributor proposed by Guerin et al. is quite satisfactory for many display lighting systems, it would nevertheless be completely inadequate for use in digital data processing equipment where the signal packing-density of the recording medium requires a considerably larger number of output circuits for efficient operation. Further, some interaction or cross-talk among the output circuits would be innocuous in a display lighting system, for example, while a lamp connected to a first output circuit is selectively illuminated, a second lamp connected to an adjacent output circuit may have a considerable voltage applied to it and still remain dark because the voltage is below the level necessary to cause the lamp filament to glow. Similar interaction would be intolerable in a system for distributing digital information since the application of spurious signals of varying amplitudes to unselected output circuits would result in unpredictable errors having a deleterious effect on the system operation.

2

In the present system, measures have been taken to prevent output signals from straying to output circuits adjacent to the selected output. Briefly, this is accomplished by arranging a plurality of ferrite core structures and their associated secondary output windings on two separate planes stacked one above the other; each plane having its own common primary winding. Separate flux-shorting bars or cursors, mounted on a common shaft are employed to vary the coupling between the primary and secondary windings situated on each plane. The digital information to be distributed is applied serially to the switching device. The ferrite cores on each plane are associated with alternate digit intervals. Circuit means are employed to direct the signals entering the switching device alternately to the two primaries so that only the selected secondary on one of the assembly planes can receive a signal during any one digit interval. Thus, there is no possibility that signals will be distributed to the two channels adjacent to the selected channel on a first plane since the input signals are switched from the primary winding on said first plane to the primary winding of a second plane as soon as the selected channel has received its recorded information and before the ferrite cursor couples the primary secondary windings of said adjacent channels.

It is therefore a primary object of the instant invention to provide an improved system for distributing the information stored on a memory disc or drum to a relatively large number of output channels without the danger of inter-channel cross-talk.

A further object of the invention is to provide a novel switching device having a plurality of core structures arranged on separate planes and adapted to distribute successive signals impressed alternately on common input windings linking the cores on each plane to a plurality of utilization devices connected respectively to output windings linking each of said core structures.

Another object of the invention is to provide a more efficient signal distribution system by utilizing a switching device which requires only one power amplifier per group of cores linked by a common primary input winding, instead of individual amplifiers to drive the utilization circuits connected to the secondary output windings of each of said cores.

These and further objects and features of this invention may be most effectively observed with reference to the following description and accompanying drawings wherein.

Figure 1:
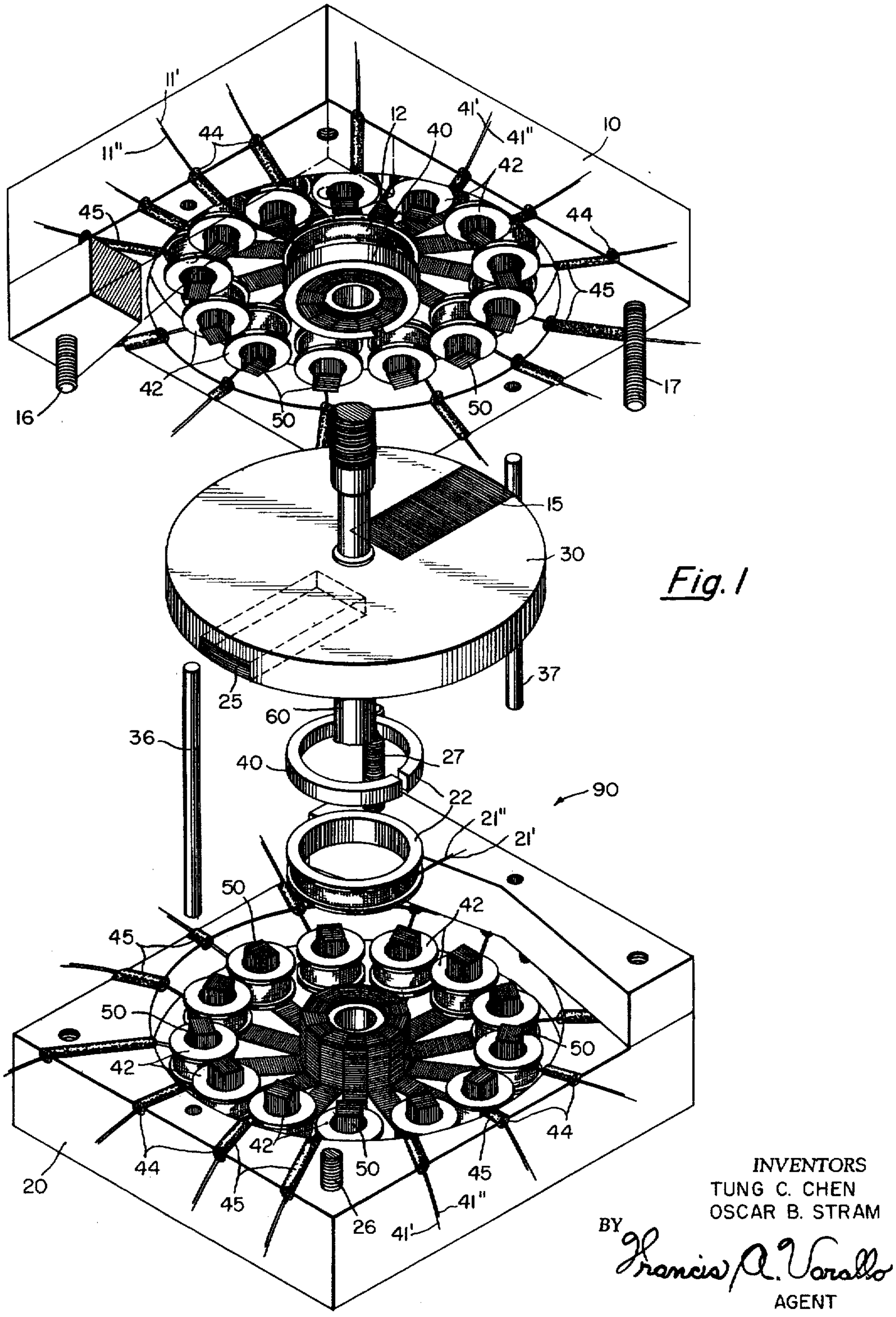
FIG. 1 is an exploded view of a preferred embodiment of the transformer distributor.
Figure 2:
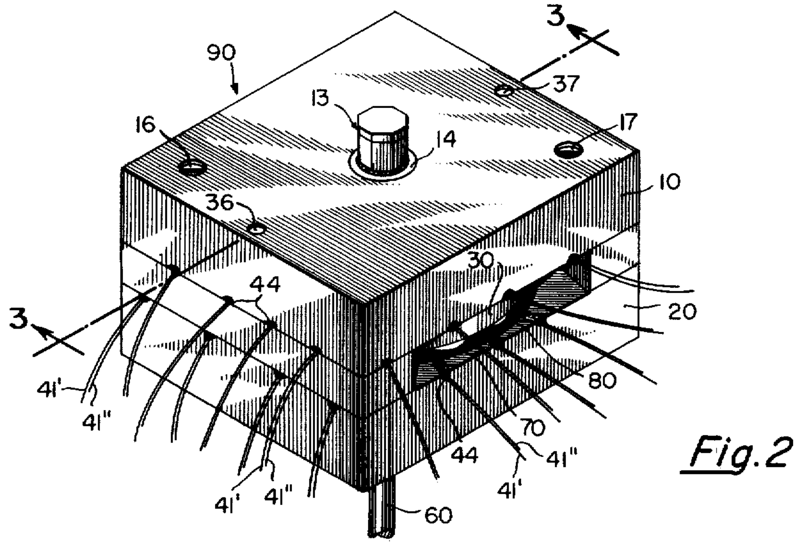
FIG. 2 depicts the distributor in its assembled form.
Figure 3:
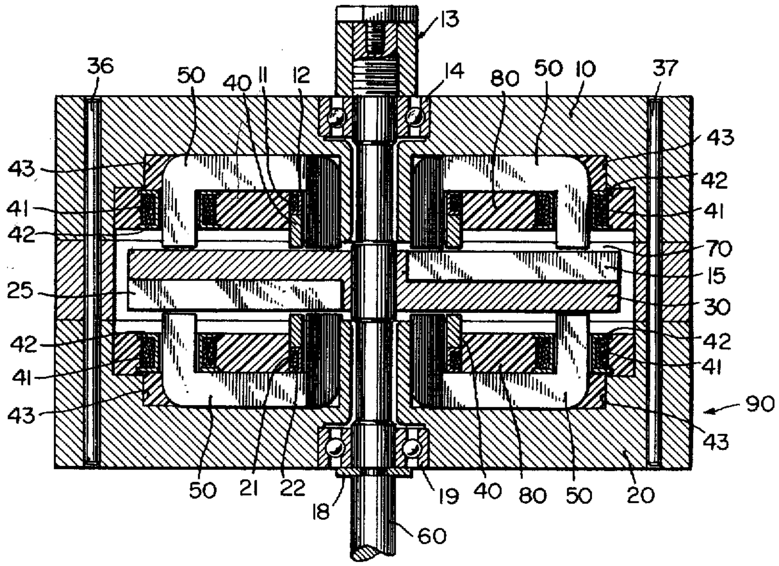
FIG. 3 is a section view of the distributor taken along line 3—3 of FIG. 2.

In consideration of FIGS. 1, 2 and 3 there are depicted two casings 10 and 20, each housing an assembly plane comprising a plurality of U-shaped ferrite cores 50 embedded in radial slots 43. All of the U-core legs or pole pieces positioned at the inner diameter of the assembly plane associated with the upper casing 10 are encircled by a common primary winding 11 wound on a bobbin 12, while the core legs similarly positioned on the assembly plane of the lower casing 20 are encircled by primary winding 21 wound on bobbin 22. Each of the core legs at the outer diameter of the assembly planes are encircled by a secondary winding 41 wound on bobbin 42. Slots 44 are provided in the casings to allow the lead wires 11′—11″ and 21′—21″ of the primary windings 11 and 21 respectively, and 41′—41″ of the secondary windings 41 to be brought out from the distributor assembly 90. Each pair of lead wires is protected from abrasion by sleeve 45 placed in each of the slots 44. A split metal ring 40 of nonmagnetizable material is positioned atop each of the primary winding bobbins 12 and 22 and encircles all of the core legs at the inner diameter of each assembly plane. The function of the ring 40 is to minimize the fringing and leakage flux which exists in the air gap separating the inner and outer core legs; the split being necessary to prevent the ring from acting like a short circuited turn of a secondary winding. Two ferrite bars or cursors, 15 and 25, are shown embedded in radial slots in the plane surfaces of a metallic nonmagnetizable disc 30 mounted on shaft 60. It should be noted that there is little magnetic coupling between the primary and secondary windings because of the high reluctance of the long air gap between the pole faces of the inner and outer core legs. As the cursor disc 30 is made to rotate in close proximity to the cores 50 of both assembly planes, the ferrite bars 15 and 25 scan over the open faces of the core legs in casings 10 and 20 respectively, thereby momentarily bridging the air gap of each core successively. During the time that a ferrite bar is engaged with any U-core the reluctance of the magnetic path linking the primary and secondary windings of that core becomes quite low and the signal voltage on the primary windings which links the engaged core induces an output voltage in the secondary winding on that core only. The nonmagnetic material of the cursor disc 30 provides eddy-current shielding for the unengaged secondary windings. When the transformer distributor is assembled as depicted in FIG. 2, the relative positions of the cursors and the core assemblies must be taken into consideration in order to achieve the proper sequencing of the output signals induced in the secondary windings on both core planes. The manner of properly sequencing or phasing these output signals will be hereinafter considered in detail.

In the embodiment of the instant invention depicted in FIGS. 1, 2 and 3, the two casings 10 and 20 are assembled in such a manner that the cores situated on the two planes lie directly opposite one another and are separated by an aperture 70, within which is positioned the rotatable cursor disc 30. The cursors 15 and 25 are embedded flush in opposite sides of the disc 30 and are displaced 180° from each other. A small air gap separates the cursor disc from the core legs and there is no physical contact between them. The upper and lower casings are guided into their assembled positions by pins 36 and 37 and are secured by screws 16, 17, 26 and 27. Shaft 60 is tapped at one extremity of the assembly 90 to accommodate a locking screw type assembly 13 against which the inner race of the bearing 14 is positioned; the outer race being press-fitted into or otherwise suitably secured to casing 10. At the other extremity of the distributor assembly, a retainer ring 18 is fastened to the shaft and contacts the inner race of bearing 19; the outer race of said latter bearing being secured to casing 20. In order to achieve a more integral unit each of the casings is filled with potting compound 80 as illustrated in FIGS. 2 and 3.

Figure 4:
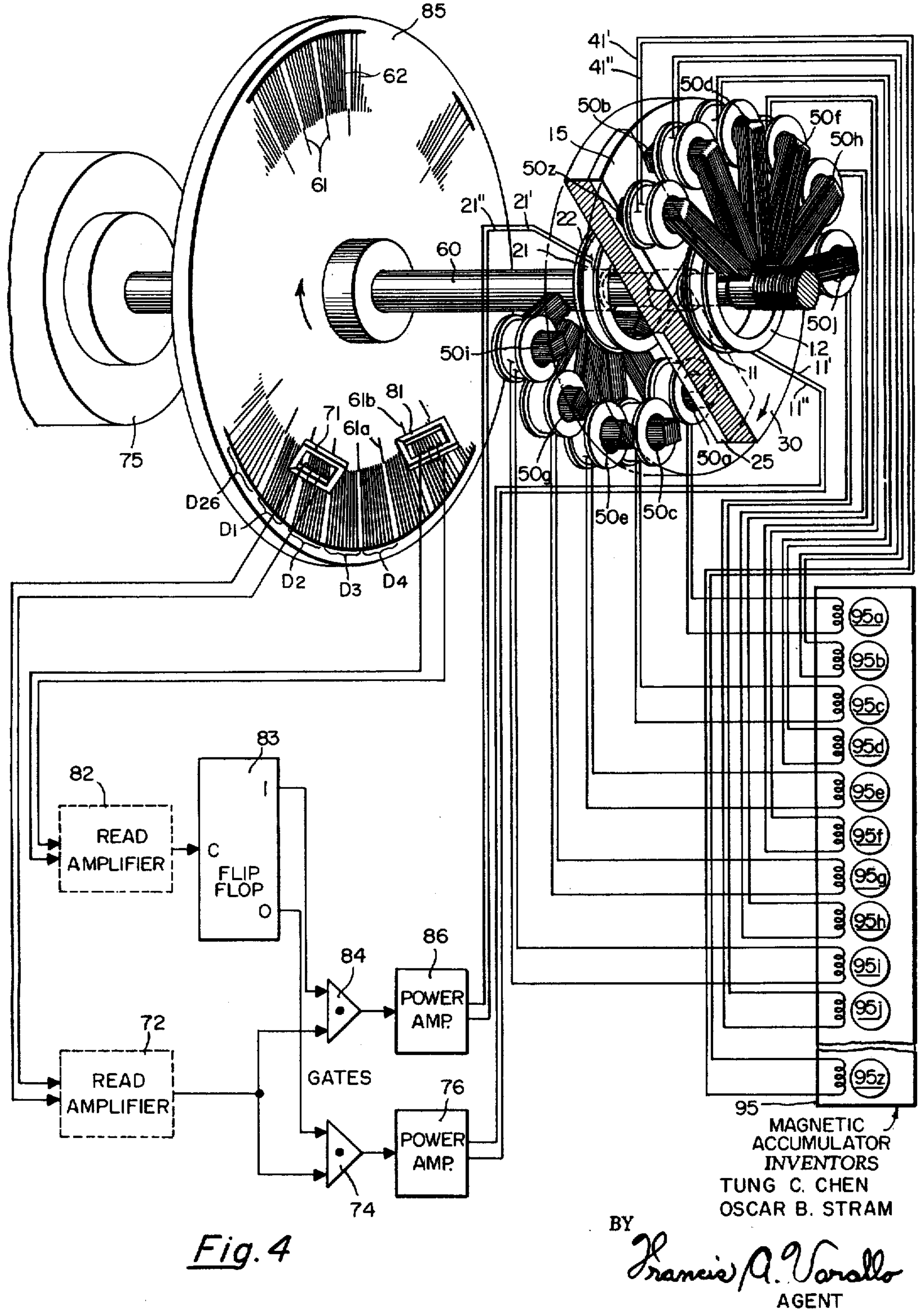
FIG. 4 illustrates the operation of the transformer distributor in a computer system.

FIG. 4 shows the transformer distributor in combination with portions of a digital computing system. It is to be understood that the transformer distributor of the instant invention has general utility in many applications, and its use is not limited to the system hereinafter described. The memory disc 85 depicted in the system of FIG. 4 is described and claimed in the copending application of T. C. Chen, Serial No. 482,854, now Patent No. 2,969,527, which is assigned to the same assignee as the instant application. Briefly, the memory disc 85 has a flat nonmagnetic surface to which has been applied a recording magnetic medium in a pattern of radial spokes 62 so that there is one spoke per bit of the digits to be stored. The particular system illustrated utilizes the binary decimal notation; hence a digit is comprised of nine bits. Both the bits which comprise a digit and the digits which form a word are recorded in serial fashion on the disc. In order to utilize the area on the disc more efficiently, the time between digits is rather small, being approximately one bit time. The information signals stored on the disc are read out by a magnetic head 71 positioned to scan the radial spokes 62 of the rotating disc 85. A separate magnetic head 81 is employed to scan a series of digit markers 61 placed on the disc for synchronizing purposes. The output data signals read by magnetic head 71 are applied simultaneously to an input terminal of each of two gate circuits 74 and 84. Although the signal output of magnetic head 71 is of sufficient amplitude to require no amplification prior to its application to the gate circuits, a read amplifier 82 may be necessary in other systems to amplify the signal from the data track read head. Such amplifiers are common in data processing systems but vary appreciably in design depending upon the signal to be amplified and the utilization circuit. An example of a read amplifier is shown in FIG. 2.13 of "Decription of a Magnetic Drum Calculator," written by the Staff of the Computation Laboratory, Harvard University. The gate circuits 74 and 84 may be of the vacuum tube variety, as shown in FIG. 2.2(*b*) of the aforementioned Harvard University publication, or the crystal rectifier type as shown in FIG. 2–2(*b*) of "Arithmetic Operation in Digital Computers" by R. K. Richards.

In general the gate circuits may be primed by circuit means synchronized with the rotation of the storage device in such a manner that consecutive digits recorded on the device are transmitted through each of the gates alternately. Information is not allowed to pass through both gates concurrently.

In the system of FIG. 4, the flow of information through the gates is controlled by an electronic flip-flop 83 whose output terminals, labelled "1" and "0," are connected respectively to a second input terminal of each of the gates 74 and 84. When the flip-flop is in the "1" state, it is to be assumed that the voltage at the "1" terminal is appropriate to prime gate 84; on the other hand, when the flip-flop is in the "0" state, gate 74 is primed. Pulses read from the digit markers 61 by head 81 during the time between digits are applied to the complement terminal C of the flip-flop 83, where they successively switch the flip-flop from one stable state to the other and alternately prime gates 74 and 84. Here again, a read amplifier 72 of a type similar to amplifier 82 may be necessary depending upon the magnitude of the digit mark pulse and the type of gate control element. The flip-flop 83 may be the basic plate-to-grid coupled bistable multivibrator shown in FIG. 5.4 in "Wave Forms," volume 19, MIT Radiation Laboratory Series, edited by B. Chance and others. However, any type of bistable element capable of remaining in one or the other of two stable states, one of said states furnishing a substantially greater output than the other, and which can be considered to transfer from either of said states to the other by momentary application of trigger pulses thereto, may be utilized in the present system.

The output signal from gate 84 is amplified by power amplifier 86 which energizes the primary winding 21, shown more clearly in FIG. 3, of the transformer distributor. In like manner the output of gate 74 is amplified by power amplifier 76 which energizes primary winding 11, shown more clearly in FIG. 3. The amplification of the data signals in this manner prior to their distribution eliminates the need for separate amplifiers to drive each of the output circuits. The function of the transformer distributor in the present system is to distribute the nine-bit digits of serial information recorded on the memory disc 85 to the appropriate magnetic element in a spacially parallel magnetic word accumulator 95. Therefore, a storage element is provided in the magnetic accumulator for each digit segment on the disc, which segment in turn corresponds to a core in the transformer distributor assembly.

In the operation of the system of FIG. 4, a motor 75 or equivalent driving means, turns shaft 60, to which are secured the memory disc 85 and the cursor disc 30. Assume that at the end of the preceding nine-bit digit D26, the pulse derived from mark **61*a* was read by magnetic head 81, triggered the flip-flop 83 and switched it to the "1 "state, thereby priming gate 84. As the data read head 71 scans the bits of information comprising the nine-bit digit D1, the data signals pass through gate 84, are amplified in amplifier 86, and are delivered via lead wires 21′—21″ to the primary winding 21. The ferrite bar or cursor 25 is shown fully engaged with the pole faces of core 50*a*. Due to the tight coupling of the primary and secondary windings effected by the closing of the long air gap between the inner and outer legs of core 50*a*, data signal voltages are induced in the secondary winding 41 of core 50*a*, and are delivered via its set of lead wires 41′—41″ to storage element 95*a* in the magnetic accumulator. It is to be observed that while cursor 25 is fully engaged with core 50*a*, cursor 15 is partially engaged with the pole faces of cores 50*z* and 50*b*. Since primary winding 11 is not energized at this time, there is no possibility of delivering spurious information to magnetic storage elements 95*z* and 95*b* associated with cores 50*z* and 50*b*, respectively. Assuming further, that the memory and cursor discs are driven in the direction of the arrow, the last bit of information from digit D1 is delivered to core 95*a* while the cursor 25 is still fully engaged with core 50*a*, and cursor 15 has not fully engaged the pole faces of core 50*b*. Subsequently, magnetic head 81 scans digit marker 61*b* which occurs during the one bit time interval separating digits D1 and D2 and delivers a pulse to the complement terminal of flip-flop 83, thereby switching the flip-flop to the "0" state and priming gate 74**.

At the end of the bit time allotted to digit marker **61*b*, head 71 scans the first bit of nine-bit digit D2 which passes through gate 74, is amplified by power amplifier 76 and is fed to the primary winding 11 by way of lead wires 11′—11″. Simultaneously with the read-out of said first bit of digit D2 by head 71, the cursor 15 completely engages the pole faces of core 50*b*. The serial bits of information comprising digit D2 are impressed on primary 11 and induce output voltages in the secondary winding 41 encircling he outer leg of core 50*b*. These induced signals are delivered to storage element 95*b* in the magnetic accumulator 95 by way of leads 41′ and 41″. In like manner, nine-bit digit D3 is transferred to core 50*c* and delivered to element 95*c*; nine-bit digit D4 is transferred to 50*d* and delivered to 95*d*, and so forth, until the last digit D26 is transferred to 50*z* and delivered to 95*z***.

In the present system of FIG. 4 the relative widths of the cursor and pole faces, the separation of the data spokes on the memory disc, and the speed of rotation of the disc have been chosen to allow the pole faces of the selected core to be completely covered by the cursor during the time that the nine serial bits of information are being transferred to the selected core. The cursors must be so arranged with respect to the cores on each assembly plane that when the radial axis, or center line, of one cursor is coincident with the radial axis of a core situated on one assembly plane, the radial axis of the other cursor lies midway between the radial axes of two of the cores situated on the other plane. In order to maintain this relationship between cursors and cores in systems involving different numbers of cores, the angular displacement of the cursors with respect to each other must be chosen accordingly; or if preferred, the relative positions of the cores of one assembly may be varied with respect to the cores of the other assembly while the angular displacement of the cursors is maintained constant. Finally, it should be noted that for many applications it is not necessary that the cursor be fully engaged with the pole faces of the selected core before substantial magnetic coupling of the primary and secondary windings is effected and the system design can be modified to take advantage of this condition.

From the foregoing description of the invention and its mode of operation, it will be evident that the instant magnetic switching device is particularly suited to applications involving a substantial number of output channels and requiring a high degree of resolution with corresponding freedom from interchannel cross-talk. Therefore, while there have been shown and described the fundamental novel features of the invention as applied to a preferred embodiment, it is to be understood that various omissions, substitutions and changes in form and details of the device illustrated and in its operation may be made by those skilled in the art without departing from the spirit of the invention. For example, the core members in the switching device have been described and illustrated as "U-shaped." The invention is not limited to cores having this particular geometry but may employ other forms such as that of the conventional cup-core used extensively in the electronic art. In this case one of the cylindrical sections of the cup-core may be molded with a plurality of pole projections designed to accommodate the secondary windings; while the other cylindrical section having an annular periphery may be encircled by the primary winding.

The features of novelty believed descriptive of the nature of the invention are described with particularity in the appended claims.

What is claimed is:

1. A signal distributing device comprising a pair of magnetic core structures each having a plurality of pole extensions separated from a common pole piece by an air gap, a primary winding linking each of said common pole pieces, a secondary winding coupled to each of said plurality of pole extensions, said magnetic structures being assembled as an integral unit but having an aperture therebetween, rotary means interposed between said core structures for bridging said air gap and successively inductively coupling a primary winding with each of its associated secondary windings, said rotary means being so positioned with respect to said pole pieces that said inductive coupling alternately affects each of said core structures.

2. A signal distributing device comprising a plurality of U-shaped magnetic cores each having first and second core legs comprising two pole pieces separated by an air gap, said cores being arranged on two parallel planes displaced from each other by an aperture, a nonmagnetic rotatable disc positioned within said aperture and having a bar of magnetic material embedded in each of its plane surfaces, a common primary winding coupling all said first legs of the magnetic cores situated on a common plane, a separate secondary winding coupled to each of said second legs of said plurality of cores, said primary and secondary windings having negligible magnetic coupling therebetween due to said air gap, said bars of magnetic material being so positioned with respect to each other and to said cores that the rotation of said disc establishes a flux path between the primary and secondary windings of the cores on both of said planes, said establishment of flux paths in one of said planes being displaced in time from that in the other of said planes such that a flux path is provided alternately for the cores situated on different planes.

3. A transformer distributor comprising in combination a pair of casings each having a circular well with a plurality of radial slots at the bottom thereof, a plurality of U-shaped ferrite cores embedded in said slots, each of said cores having two legs disposed along first and second concentric circular loci, the pole faces of the two legs of each core being separated by an air gap, said casings being assembled in such a manner that the pole faces of the cores in each casing are separated from each other by an aperture, a disc of nonmagnetic material positioned within said aperture, shaft means journalled in said casings and mounting said disc for rotation relative to said cores, a ferrite bar embedded in a radial slot in each of the plane surfaces of said disc, said bars being magnetically isolated from each other and substantially bridging the distance between said circular loci, a first winding associated with each of said casings and linking all the core legs disposed along said first circular locus, a separate second winding coupled to each of the core legs disposed along said second circular locus, a split ring positioned atop each of said first windings for eliminating the fringing and leakage fluxes between said pairs of core legs, said first and second windings having negligible magnetic coupling therebetween due to said air gap, each of said ferrite bars being positioned with respect to the pole faces of the cores on its side of the disc so as to bridge said air gap and successively inductively couple the primary and secondary windings of each of said ferrite cores, said ferrite bars being oriented with respect to each other such that said inductive coupling is provided alternately in cores situated in the different casings.

4. A signal distributing device comprising a plurality of ferrite cores, each of said cores having a pair of pole extensions separated by an air gap, an odd number of said cores being arranged respectively on two planes and assembled in such a manner that the pole extensions of the cores on one plane are directly opposite the pole extensions of the cores on the other plane but separated from one another by an aperture, a disc of nonmagnetic material rotatably mounted within said aperture and having a ferrite bar embedded in a radial slot in each of its plane surfaces, said ferrite bars being displaced an angle of 180 degrees from each other, a primary winding linking one of said pair of pole extensions of all the cores situated on a common plane, a secondary winding coupled to each of the second of said pair of pole extensions, said primary and secondary windings on each core having negligible magnetic coupling therebetween due to said air gap, the rotation of said disc causing each of said ferrite bars to bridge said air gap and to successively establish a magnetic flux path between the primary and secondary windings of each of the cores situated on a common plane, the establishment of a flux path in consecutive cores of one of said planes being displaced in time from the establishment of a flux path in consecutive cores of the other of said planes, whereby at any selected time, only a single flux path is established in said distributing device, said flux path alternating from a ferrite core on one plane to a core on the other plane as said disc is rotated.

5. A signal distributing device comprising a plurality of magnetic cores, each of said cores having first and second pole pieces separated from each other by an air gap, said cores being assembled in two casings displaced from each other by an aperture, a disc of nonmagnetic material positioned within said aperture, shaft means journalled in said casings and mounting said disc for rotation relative to said magnetic cores, a first and second bar of magnetic material embedded in radial slots in the plane surfaces of said disc and being magnetically isolated from each other, a primary winding associated with each of said core casings and linking in common said first pole pieces of the magnetic cores assembled in its casing, said primary windings being adapted to be pulsed from a source of signals, a secondary winding coupled to each of said second pole pieces of said plurality of cores, said first bar of magnetic material being positioned with respect to the pole pieces of the cores on one of said casings so as to successively inductively couple the primary and secondary windings of each of said latter cores, said second bar of magnetic material being positioned with respect to the pole pieces of the cores on the other of said casings so as to successively inductively couple the primary and secondary windings of each of the cores situated in said latter casing, said first and second bars being oriented with respect to each other such that when said first bar is fully inductively coupled to the pole pieces of a core on one of said casings, said second bar is offset with respect to the full inductive coupling of the pole pieces of a core on the other of said casings, gating means interposed between said primary windings and said signal source for causing successive input signals to alternately energize each of said primary windings, the speed of rotation of said bars being adjusted to conform with the repetition rate of said input signals in order that when either of said first or second bars is fully engaged with the pole pieces of one of said magnetic cores, the primary winding linking said latter core is concurrently energized by said signal source, the secondary winding disposed on said latter core being coupled to said energized primary winding by said bar and having an output voltage induced therein, said successive input signals being distributed individually to said secondary windings in such a manner that a single secondary winding is energized at any one time, and means for utilizing said induced voltages.

6. In a signal distribution system, the combination of a rotatable storage device having discrete data and marker signals recorded thereon, each of said marker signals occurring between consecutive data signals, first and second sensing means for respectively reading said data and marker signals from said storage device, a transformer distributor comprising a plurality of magnetic cores, each of said cores having first and second pole pieces separated from each other by an air gap, said cores being assembled in two casings displaced from each other by an aperture, a disc of nonmagnetic material positioned within said aperture, shaft means journalled in said casings and mounting said disc for rotation relative to said magnetic cores, said storage device being coupled to said shaft means, driving means attached to said shaft means, a first and second bar of magnetic material embedded in one and the other of the two plane surfaces of said disc respectively, a primary winding associated with each of said core casings and linking in common said first pole pieces of the magnetic cores assembled in its casing, said primary windings being adapted to be pulsed by said data signals stored on said magnetic device, secondary windings individually coupled respectively to said second pole pieces of each of said plurality of cores, said first bar of magnetic material being positioned with respect to the pole pieces of the cores in the other of said casings so as to successively inductively couple the primary and secondary windings thereof, said second bar of magnetic material being positioned with respect to the pole pieces of the cores in the other of said casings so as to successively inductively couple the primary and secondary windings of each of the cores situated in said latter casing, said first and second bars being oriented with respect to each other such that when said first bar is suitably inductively coupled to the pole pieces of one core in one of said casings, said second bar is displaced with respect to the preferred engagement of the pole pieces of a core in the other of said casings, gating means connected to said second sensing means and interposed between said primary windings and said first sensing means and being controlled by said marker signals derived from said second sensing means whereby consecutive data signals are directed through said gating means to alternately energize each of said primary windings, means for amplifying said data signals prior to their energization of said primary windings, the speed of rotation of said bars and the rate at which said data and marker signals are read from said storage device being synchronized by virtue of the mounting of said disc and said storage device on common shaft means, said synchronization assuring that whenever the pole pieces of a selected core are suitably engaged by one of said bars, a marker signal is read out from said storage device by said second sensing means and is applied to said gating means which in turn directs the succeeding data signal to the primary winding coupled to said selected core, the secondary winding linking said selected core being magnetically coupled to said energized primary winding and having an output voltage induced therein, each of said data signals recorded on said storage device being distributed to one of said secondary windings, and means connected to said secondary windings for utilizing said induced voltages.

7. A system as defined in claim 6 wherein said rotatable storage device is a memory disc comprising plane non-magnetic surfaces having a plurality of radial magnetic spokes applied thereto, each of said spokes being adapted for storing a single bit of data, said data signals each comprising a group of said spokes, and a marker spoke interposed between said groups of data signal spokes.

8. A system as defined in claim 7 wherein said first and second sensing means are magnetic read heads or playback pole pieces mounted on brackets in close proximity to a surface of said memory disc.

9. A system as defined in claim 6 wherein said gating means comprise in combination a flip-flop circuit having an input complement terminal and two output terminals, a pair of gate circuits each having first and second input terminals and an output terminal, said flip-flop input terminal being connected to said second sensing means for receiving said marker signals, said flip-flop output terminals being connected respectively to each of said first input gate terminals, said second input gate terminal being connected in common to said first sensing means for receiving said data signals concurrently, the output terminals of said gates being connected respectively to said primary windings by way of said amplifying means, the voltage level at each of the output terminals of said flip-flop being a function of the remanent state of said flip-flop, the application of a marker pulse to said complement terminal switching said flip-flop from one remanent state to the other, the voltages on said output terminals priming each of said gates alternately in response to successive switchings of said flip-flop by said marker pulses.

10. A system as defined in claim 6 wherein said means connected to said secondary windings for utilizing said induced voltages are magnetic core storage elements arranged in a spacially parallel configuration.

11. In a transformer distributor, two sets of magnetic core elements, the core elements of each set being substantially alike and exhibiting a U-shaped formation having two pole pieces separated by an air gap, means mounting the core sets in slightly spaced apart parallel planes with the core elements of each set circularly disposed around a common axis and such that their pole pieces are positioned along concentric circular loci of different radii, a primary winding associated with each of the sets of core elements and inductively linking the same in common, a secondary winding individual to each core element and inductively linking the same, a member of non-magnetic material positioned within the space separating the two core sets and mounted for rotation therein on said common axis, a cursor bar of magnetic material for each set of cores carried by said rotatable member in magnetic isolation to one another, each cursor bar being effective for its associated set of core elements to inductively bridge the distance between said circular loci and upon rotation of the member to successively sweep the core elements of its set and inductively bridge the gap between the pole pieces of each core element as it passes thereby, said sets of core elements and said cursor bars being oriented with respect to one another such that when a cursor bar of one set fully inductively couples the pole pieces of a core element the cursor bar of the other set is offset to the pole pieces of any core element, whereby upon rotation of the member the air gaps of the core elements of each set are successively bridged by its cursor bar but alternately in time spaced relation to the bridging of the air gaps of the core elements of the other set.

12. A transformer distributor comprising, in combination, two sets of magnetic core elements, the core elements of each set being substantially alike and exhibiting a U-shaped formation having two pole pieces separated by an air gap, means mounting the core sets in slightly spaced apart parallel planes with the core elements of each set circularly disposed around a common axis and such that their pole pieces are positioned along concentric circular loci of different radii, a primary winding associated with each of the sets of core elements and inductively linking the same in common, a secondary winding individual to each core element and inductively linking the same, a member of non-magnetic material positioned within the space separating the two core sets and mounted for rotation therein on said common axis, a cursor bar of magnetic material for each set of cores carried by said rotatable member in magnetic isolation to one another, each cursor bar being effective for its associated set of core elements to inductively bridge the distance between said circular loci and upon rotation of the member to successively sweep the core elements of its set and inductively bridge the gap between the pole pieces of each core element as it passes thereby, said sets of core elements and said cursor bars being oriented with respect to one another such that when a cursor bar of one set fully inductively couples the pole pieces of a core element the cursor bar of the other set is offset to the pole pieces of any core element, whereby upon rotation of the member the air gaps of the core elements of each set are successively bridged by its cursor bar but alternately in time spaced relation to the bridging of the air gaps of the core elements of the other set, means for providing electrical signals synchronized with the rotation of the member, and gating means interposed between said primary windings and said signal providing means and operable to deliver successive signals from the latter alternately to the primary windings of the core sets.

13. A magnetic switching device comprising a pair of magnetic core structures each having a plurality of pole extensions separated from a common pole piece by an air gap, a first winding linking each of said common pole pieces, a second winding coupled to each of said plurality of pole extensions, said magnetic structures being assembled as an integral unit but having an aperture therebetween, rotary means interposed between said core structures for bridging said air gap and successively inductively coupling a first winding with each of its associated second windings, said rotary means being so positioned with respect to said pole pieces that said inductive coupling alternately effects each of said core structures.

14. A magnetic switching device comprising a plurality of U-shaped magnetic cores each having first and second core legs comprising two pole pieces separated by an air gap, said cores being arranged on two parallel planes displaced from each other by an aperture, a non-magnetic rotatable disc positioned within said aperture and having a bar of magnetic material embedded in each of its plane surfaces, a common first winding coupling all said first legs of the magnetic cores situated on a common plane, a separate second winding coupled to each of said second legs of said plurality of cores, said first and second windings having negligible magnetic coupling therebetween due to said air gap, said bars of magnetic material being so positioned with respect to each other and to said cores that the rotation of said disc establishes a flux path between the first and second windings of the cores on both of said planes, said establishment of flux paths in one of said planes being displaced in time from that in the other of said planes such that a flux path is provided alternately for the cores situated on different planes.

References Cited in the file of this patent

UNITED STATES PATENTS

| | | |
|---|---|---|
| 1,706,837 | Bailey | Mar. 26, 1929 |
| 1,984,939 | Nachumsohn | Dec. 18, 1934 |
| 2,098,002 | Guerin et al. | Nov. 2, 1937 |
| 2,442,751 | Abbott | June 8, 1948 |
| 2,614,248 | Ostreicher | Oct. 14, 1952 |
| 2,633,564 | Fleming | Mar. 31, 1953 |
| 2,637,839 | Piety | May 5, 1953 |
| 2,683,989 | Clark | July 20, 1954 |
| 2,701,357 | Newby | Feb. 1, 1955 |
| 2,702,380 | Brustman et al. | Feb. 15, 1955 |
| 2,740,110 | Trimble | Mar. 27, 1956 |
| 2,854,655 | Blaufoy et al. | Sept. 30, 1958 |
| 2,884,620 | Sepahban | Apr. 28, 1959 |
| 2,930,034 | Berman | Mar. 22, 1960 |

UNITED STATES PATENT OFFICE

CERTIFICATE OF CORRECTION

Patent No. 3,112,474

November 26, 1963

Tung Chang Chen et al.

It is hereby certified that error appears in the above numbered patent requiring correction and that the said Letters Patent should read as corrected below.

Column 8, line 53, for "in the other" read -- on one --.

Signed and sealed this 28th day of April 1964.

(SEAL)
Attest:

ERNEST W. SWIDER
Attesting Officer

EDWARD J. BRENNER
Commissioner of Patents